United States Patent [19]
Leichner et al.

[11] Patent Number: 6,050,490
[45] Date of Patent: Apr. 18, 2000

[54] HANDHELD WRITING DEVICE AND RELATED DATA ENTRY SYSTEM

[75] Inventors: Robert Leichner, Menlo Park; Bo Curry, Redwood City; Daniel Flickinger, San Francisco, all of Calif.

[73] Assignee: Hewlett-Packard Company, Palo Alto, Calif.

[21] Appl. No.: 08/962,066

[22] Filed: Oct. 31, 1997

[51] Int. Cl.[7] ............... G06K 7/10; G08C 21/00
[52] U.S. Cl. ............... 235/462.49; 178/18.01; 178/19.01
[58] Field of Search .............. 235/462.49; 178/18.01, 178/19.01; 358/478, 483, 474; 345/166, 179; 341/13; 382/314, 188

[56] References Cited

U.S. PATENT DOCUMENTS

| | | | |
|---|---|---|---|
| 4,523,235 | 6/1985 | Rajchman | 358/256 |
| 4,695,680 | 9/1987 | Kable | 178/19 |
| 5,045,645 | 9/1991 | Hoendervoogt et al. | 178/19 |
| 5,223,677 | 6/1993 | Kapp et al. | 178/18 |
| 5,243,149 | 9/1993 | Comerford et al. | 178/18 |
| 5,247,137 | 9/1993 | Epperson | 178/18 |
| 5,247,285 | 9/1993 | Yokota et al. | 345/169 |
| 5,411,790 | 5/1995 | Ogawa et al. | 428/209 |
| 5,627,349 | 5/1997 | Shetye et al. | 178/18 |
| 5,629,499 | 5/1997 | Flickinger et al. | 178/18 |
| 5,652,412 | 7/1997 | Lazzouni et al. | 178/18 |

FOREIGN PATENT DOCUMENTS

| | | |
|---|---|---|
| 0573018A2 | 12/1993 | European Pat. Off. |
| 04120616 | 4/1992 | Japan . |
| 06230880 | 8/1994 | Japan . |

*Primary Examiner*—Thein M. Le
*Assistant Examiner*—Daniel H. Sherr
*Attorney, Agent, or Firm*—Marc P. Schuyler

[57] ABSTRACT

This disclosure provides a handheld writing device and a related data entry system. In particular, a digital electronic clipboard is used to mount pages or forms utilized in forms processing applications, such as inventory tracking. A stylus having a writing tip at one end of the stylus and a bar code scanning mechanism at another end of the stylus is used to enter data on the pages or forms and scan bar codes appearing on the pages or forms themselves, or on a separate item to be associated with the form. The system detects whether bar code data or stylus position data is being generated and causes its CPU to responsively process entered data. In an alternative embodiment, the system also permits generation of only one of stylus position data and bar code data at any given time. By providing a bar code scanner in the same implement as the stylus, the system permits a user to scan bar codes without having to replace the stylus or obtain a scanning implement; furthermore, scanning of a bar code on a preprinted form inherently provides a stream of stylus data with information to exactly reproduce a hardcopy form completed by the user, e.g., by combining an image of the preprinted form with entered stylus data.

18 Claims, 5 Drawing Sheets

FIG. 7 form.

HANDHELD WRITING DEVICE AND RELATED DATA ENTRY SYSTEM

The present invention relates to a handheld writing device used in bar code or symbol scanning applications. In particular, the present invention provides a combination stylus and scanner having a wide range of applications.

BACKGROUND

Digitizers and scanners have recently gained importance in the field of form processing and inventory tracking. For example, systems have recently been designed which electronically capture signatures for credit card verification or to evidence receipt of a document or package. In other applications, bar code or symbol scanning is used to perform inventory tracking, for example, to track deliveries by overnight couriers. In these applications, a completed form (e.g., a shipping document) is matched with an electronic data set (e.g., with a scanned bar code of a package or an electronically captured signature). Some applications propose the use of both a digitizer and a scanner; for example, a deliveree's signature can be matched to both a form (such as a shipping document) as well as a bar code from a package that was delivered.

U.S. Pat. No. 5,629,499 (the "'499 Patent") relates to a multiple page or form digitizing clipboard. Using the clipboard, a user can write upon multiple, stacked pages or forms, with a digitizer beneath the pages or forms capturing pen stroke information; a user interface is utilized to switch a definition of a current page between the multiple pages or forms, and electronic information is thereby associated with a selected one of the pages or forms. The clipboard disclosed by the '499 Patent is suitable for many forms applications, e.g., inventory tracking and the like, since an electronic record (or "instance") of all entered pen strokes is automatically created with the interface being used to select a "type" of form. Used in the context of inventory tracking, for example, the clipboard of the '499 Patent permits a user to both complete a hardcopy form, and to also automatically retain an electronic record of everything entered onto the form.

Unfortunately, a problem with mechanisms having both a scanner and a stylus/digitizer is that both typically are distinct devices, and must be separately handheld. Since most users are either left or right handed, typical operation using a scanner and stylus requires the user to place one of them down in order to employ the other; this problem is particularly acute where, as in the case of many systems, the digitizer is also a handheld item. It is generally awkward to switch between the devices, and a user might be hampered from readily using the two if both are used frequently.

A definite need exists for a digitizing and scanning system which does not require a user to awkwardly handle a separate scanning mechanism and stylus mechanism; ideally, both mechanisms should be installed in the same implement, such that the user does not have to put one down in order to handle the other. Ideally also, such a system should be inexpensive in construction, and be simple to use. The present invention solves these needs and provides further, related advantages.

SUMMARY OF THE INVENTION

The present invention solves the aforementioned needs by providing a combination writing device and scanning mechanism which does not require a user to exchange implements to alternately use each of them. As a result, the present invention provides an easy-to-use device with ready applications to inventory tracking and other forms-processing applications.

One form of the invention provides a writing device which may be used with a digitizer apparatus. The writing device has two ends, with a writing tip mounted at an end and a scanning mechanism for scanning a symbol also mounted at an end of the device.

In more detailed aspects of the invention, the scanning mechanism and the writing tip are mounted at opposite ends of the device, such that a user would normally have to turn the writing instrument over to switch between using each of them. The invention can also be implemented with an interpretation mechanism, which interprets data from each of the writing tip and the scanning mechanism. In particular, this mechanism can consist of a circuit which tests data from each of the writing tip and the scanning mechanism and passes only valid data to the digitizer apparatus. The writing tip can also be made to be an inking tip, such that a user can both complete a hardcopy of a form, and simultaneously generate an electronic record of information entered onto the form.

Finally, the present invention can be used in applications which feature bar codes, for example, bar codes mounted on inventory items or packages for delivery, or bar codes which identify the particular form being utilized, for later combination of stylus data entered onto the form with an image representing preprinted information of the form. In the latter context, the scanning of bar codes to identify form type enables the use of optical character recognition ("OCR") to distinguish data entry fields across many different forms, notwithstanding that only pen stroke information is digitized.

The invention may be better understood by referring to the following detailed description, which should be read in conjunction with the accompanying drawings. The detailed description of particular preferred embodiments, set out below to enable one to build and use particular implementations of the invention, is not intended to limit the enumerated claims, but to serve as particular examples thereof.

BRIEF DESCRIPTION OF THE DRAWINGS

FIG. 2 is a system diagram showing major functional elements of the clipboard of FIG. 1, includes a stylus, a digitizer section and a remote computer; FIG. 2 also illustrates the breakdown of a preferred electronic bus which connects the stylus to the digitizer section.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a handheld writing device and related data entry system, namely, a digital electronic clipboard that implements both a stylus and a bar code scanner. The invention, however, may also be applied to other types of systems as well.

I. Introduction to the Principal Parts

The present invention is embodied in a digital electronic clipboard 11 having special applications to page and form processing systems. U.S. Pat. No. 5,629,499 (the "'499 patent") sets forth background relating to a clipboard design utilized in the preferred embodiment, and is hereby incorporated in reference in its entirety, as though reproduced herein.

Figure 1:
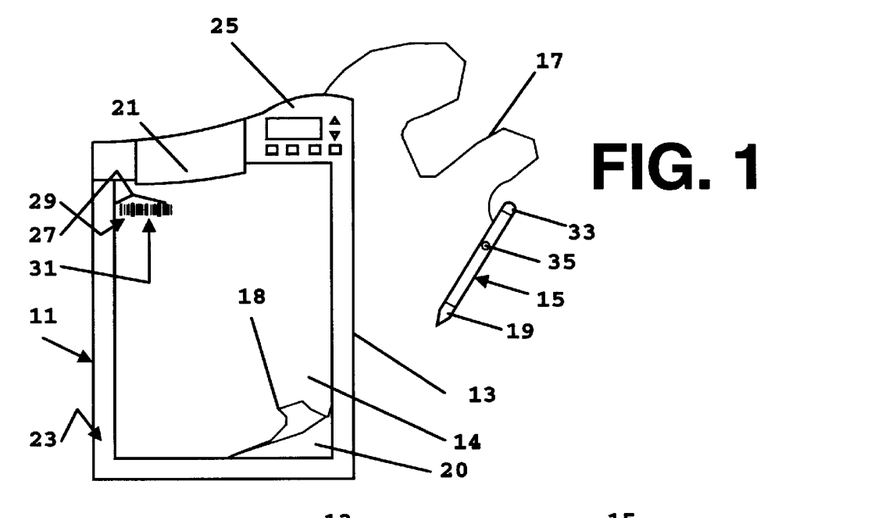
FIG. 1 shows a digital electronic clipboard which implements a stylus having both a writing tip at one end of the stylus, and a bar code scanner at an opposite end of the stylus; a form mounted on the clipboard is seen to possess a bar code which identifies the form.

With reference to FIG. 1, a digital electronic clipboard 11 is illustrated as including a digitizer section 13, which supports a top page 14 (e.g., blank paper or a preprinted document having data entry fields), a stylus 15 for writing on pages and generating electronic stylus data, and a tether 17, which physically and electronically connects the stylus to the clipboard. A corner 18 of the top page is seen as "lifted" to reveal the presence of a second, bottom page 20, beneath the top page. In the context of the present invention, it is desired to provide a user with a mechanism for identifying a bar code or symbol that is to be associated with the page or form being completed. This bar code can be any type of symbol which will be associated with the particular form, for example, a bar code on an object stored in inventory, or a package being delivered. Also, in the context of the present disclosure, each of the terms "bar code" and "symbol" are used interchangeably and cover the other, and the terms should be understood to include conventional bar codes, symbology, and other forms of visual symbols which are scanned.

To implement the mechanism for identification, the stylus is fitted with both a writing tip 19, at one end of the stylus, and a bar code scanning mechanism 33 at an opposite end of the stylus. A user simply inverts the stylus, uses it to read the bar code, and then continues writing on the page or form 14 or 20; electronic indications produced by the bar code scanning mechanism 33 are sent via the tether 17 to electronics within the digitizing section 13.

In a preferred application of the clipboard 11, the bar code is directly printed on the page or form itself, and is used to identify to the clipboard the "type" and "instance" being utilized. Examples of form types would include "blank forms" (e.g., plain paper), "shipping manifest," and the like, whereas specific instances would include filled out copies of the same form, for example, "shipping manifests" for different items in possibly varying states of completion. As seen in FIG. 1, a bar code 27 on the top page is seen to consist of a first portion 29, which identifies form "type" (e.g., "shipping invoice for company X") as well as a second portion 31 which identifies form "instance" (e.g., no. "Z") of the form. Upon detecting such a bar code, the clipboard is able to insert a form identifying code into a stream of stylus position data, such that for example a user could switch to the top page 14 and scan the bar code 27 to identify the transition. As a result, any data from the writing tip 19 of the stylus entered subsequent to a bar code swipe (for example, entered after reading of the bar code 31 on the top page 14) will be automatically associated with that page (even though the bottom page 20 lies underneath). To switch to the bottom page 20, the user could swipe a bar code (not seen in FIG. 1) of the bottom page and subsequent data from the writing tip 19 would be associated with the bottom page.

The writing tip 19 preferably includes an inking mechanism which enables a user to actually write on the pages 14 and 20, such that a hard copy of the pages can be created, consistent with many conventional forms applications. Simultaneous with generation of inked, hardcopy pages, components within both the stylus 15 and the digitizer section 13 generate electronic position data, such that an electronic record of stylus "pen stroke" data is created and used to reproduce the completed pages. It should be recognized, as discussed by the '499 Patent, that preprinted forms can be completed in ink using the clipboard 11, and that together with knowledge of any preprinted information on the forms, each particular page or form 14 or 20 can be exactly reproduced. In the present system, although the stylus 15 generates a single data stream representing all data entered using the stylus, inserted page identification codes are effective to "paste" entered data to the proper page; consequently, a single electronic data stream is used to reproduce pages 14 and 20, with information entered on each page properly appearing on the reproduced copy. Using a remote computer (not seen in FIG. 1), an image of any preprinted form (e.g., "shipping manifest") can be later electronically combined with entered data to exactly reproduce the completed, hardcopy form. Further, using the identification code, optical character recognition can be employed to automatically process data actually written upon a page 14 or 20 without the requirement of scanning fields on the preprinted page or form (e.g., software can be instructed depending upon bar code indication of form type to search for specific data fields in defined locations).

A clip mechanism 21 pins the pages to a paper supporting surface 23 of the clipboard, and a user interface section 25 is utilized by the user to input page processing commands; for example, the user can retrieve electronic files stored in memory within the clipboard corresponding to previous occasions that the clipboard was used, and add new data to those existing files. These commands are also inserted (by internal electronics) into a stream of stylus position data produced by the writing tip 19. The clip mechanism 21 permits multiple forms or pages to be placed upon one another on top of the digitizer section 13, with the user switching back-and-forth between the multiple, overlapping pages, to enter data on each of them; the user can use bar codes printed on the forms, or the user interface 25, to switch between a definition of current form.

It is desired in the preferred embodiments that a user not be permitted to simultaneously produce valid bar code data as well as stylus position data. Therefore, the preferred embodiment features placement of the writing tip 19 (and position detection electronics) at one end of the stylus 15, and the bar code scanning mechanism 33 at an opposite end of the stylus, such that the user is required to turn the stylus "upside down" to switch between bar code scanning and writing on the form. During normal usage, it is unlikely that a user will have simultaneous need for the writing tip 19 and the bar code scanning mechanism 33 and, with one device at each end of the stylus, it may be presumed that both the writing tip and the bar code mechanism will not be producing valid data at the same time. Nevertheless, as further described below, the preferred system also can include mechanisms for automatically differentiating bar code data from stylus position data, and vice-versa, and for triggering appropriate CPU processing routines. Also, the system can also include a mechanism that prevents simultaneous production of bar code data and stylus position data by electrically passing the output of only one of the writing tip and the bar code scanning mechanism at any given time. Finally, the stylus also preferably includes a light emitting diode ("LED") or similar indicator 35 to the user that the clipboard is registering pen data or has detected a valid bar code.

Figure 2:
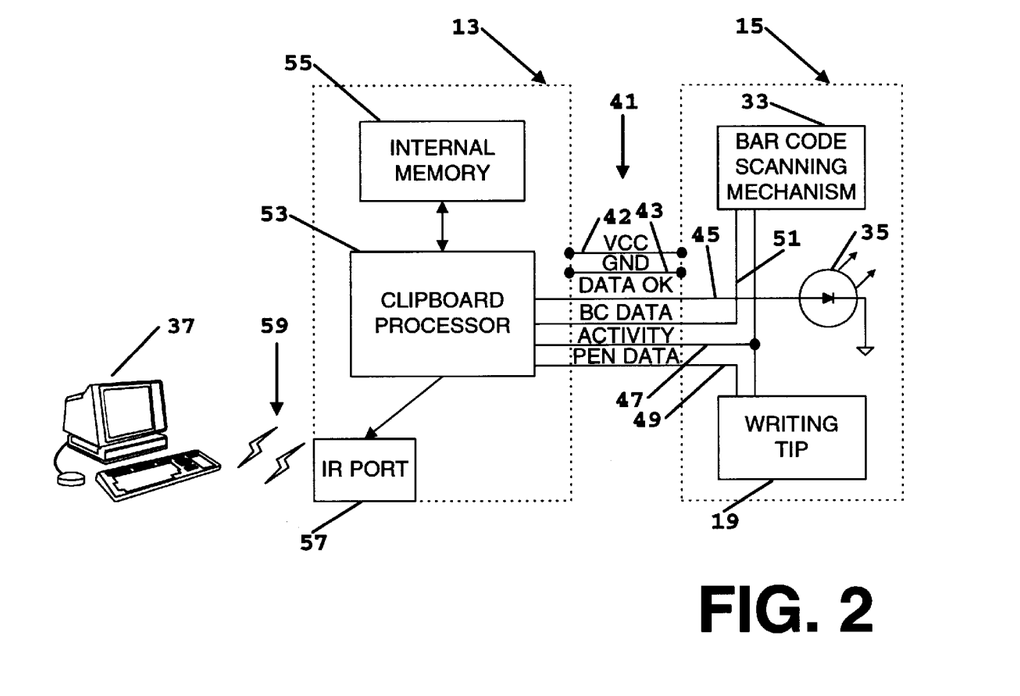

FIG. 2 illustrates schematically the format of communications utilized by the preferred device. In particular, FIG. 2 shows three functional blocks of the preferred embodiment, including the digitizer section 13, the stylus 15, and a remote computer 37. In addition, FIG. 2 also shows a six-line bus 41 which provides electrical interface between the stylus and the digitizer section 13. The six lines include power signals Vcc 42 and ground 43, an LED control signal 45, an activity signal 47, and data signals 49 and 51 from each of the writing tip 19 and the bar code scanning mechanism 33. As seen in FIG. 2, the aforementioned LED 35 is illuminated under control of the digitizer section using the LED control signal 45.

The digitizer section, seen at the left side of FIG. 2, includes a CPU 53, and internal memory 55 and an infrared ("IR") port 57 for selective communication with the remote computer 37. Normally, data entered using the stylus will, along with command codes from the user or bar code scanning mechanism 33, be entered into the internal memory and stored until the user desires to download the stored information. As indicated by the reference numeral 59, the user can selectively transmit stored data to the remote computer 37 via the IR port 57 or a hardwire (e.g., RS-232) connection (not shown in FIG. 2). These communications mechanisms can also be selectively used to download software or forms definitions to the clipboard 11 from the remote computer 37.

With the principal parts of the preferred embodiment thus introduced, the configuration of the preferred stylus and related system will now be described in additional detail.

II. Preferred Stylus Configuration and Stylus Data

Physical and electronic configuration of the preferred stylus will now be additionally explained with reference to FIG. 3.

The preferred stylus 60 includes a pen-shaped body 61 that mounts the writing tip 19 at one end ("writing end") of the stylus and the bar code scanning mechanism 33 at an opposite end ("bar code end") of the stylus. The writing tip 19 includes a tip 63 and a sensor 65 that generate an electronic indication of tip position with respect to the digitizer any time the tip is proximate (e.g., a couple of centimeters or so away from) to the paper supporting surface. In addition, the writing tip 19 includes an inking device 67 which actually inks the form when the tip is placed in contact with the form. At the same time the tip 63 is placed in contact with the form, a tip-down switch 69 is depressed within the stylus, electronically indicating that ink is being applied to a surface. The electronic indications of tip position are provided to the digitizer section (not seen in FIG. 3) as a pen data output signal 49.

At an opposite, bar code end of the stylus, the bar code scanning mechanism 33 includes optics and drivers (not separately illustrated in FIG. 3) that are selectively activated to detect whether or not a bar code is proximate to that end of the stylus. In order to activate the bar code scanning mechanism, the user would turn the stylus upside down and place the bar code scanning mechanism directly in contact with the bar code to be scanned and would swipe the bar code. When the user places that end of the stylus in contact with the surface, a bar code contact switch 71 is depressed, which both couples power (Vcc signal, 42) to the bar code scanning mechanism, as well as provides an "activity" signal output 47, as will be explained in greater detail below. Coupling of power to the bar code scanning mechanism is sufficient to cause the bar code scanner to provide logic "1"'s and "0"'s [e.g., +5 or 0 volts direct current ("DC")] as the "BC data" output signal 51, for processing within the digitizer section. The digitizer section repeatedly samples this output to determine bar code content, as is well understood in the field of bar code scanning.

Figure 3:
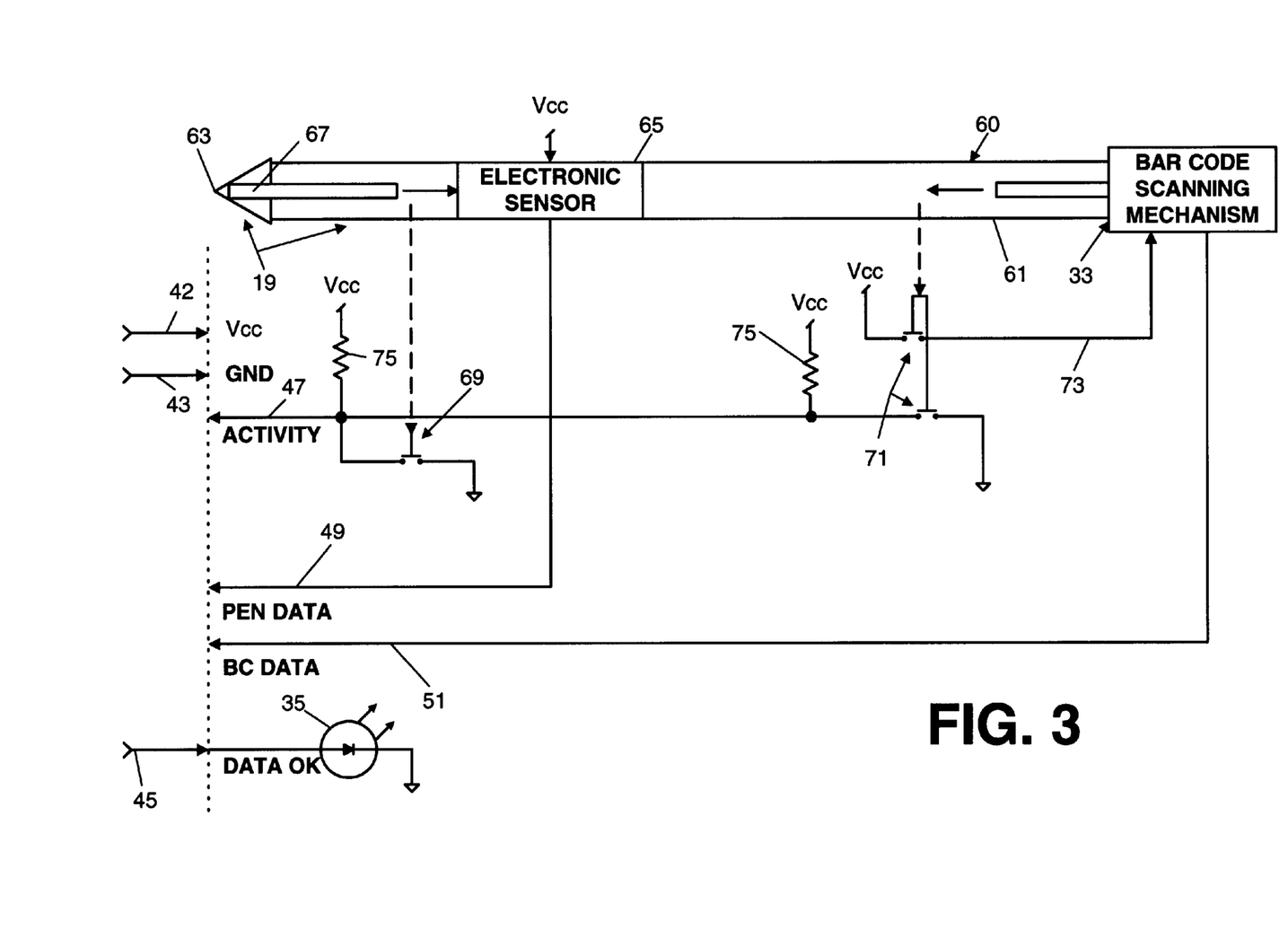
FIG. 3 is a schematic view showing electrical operation of the preferred stylus.

Although not indicated by FIG. 3, the clipboard is normally (when powered) maintained in a sleep mode during periods of inactivity. Cessation of the sleep mode and beginning of data processing preferably occurs when either the writing tip 19 or the bar code scanning mechanism 33 is used. To this effect, the tip-down switch 69 and bar code contact switch 71 are both normally tied to the Vcc signal 32 (using pull-up resistors 75), but are coupled low to the ground line 43 when either switch 69 or 72 is closed. Resultant lowering of the "activity" signal 47 is thereafter effective (through circuitry within the digitizer section) to perform an interrupt function, causing the clipboard to awaken. The activity signal 47 is also periodically analyzed by the clipboard (in connection with the pen data signal 49) to determine that stylus position data represents ink that is being applied to paper. As should be apparent from FIG. 3, the tip-down switch 69 of the writing mechanism can be a momentary contact, single-throw switch, while the bar code contact switch 71 can be a momentary contact, double-throw switch.

The preferred stylus 60 indicated in FIG. 3 is designed such that its internal electronics are as simple as possible; the design indicated in FIG. 3 is based on the assumption that the bar code contact switch will not be depressed at the same time that valid stylus position data is being produced. However, if desired, an additional mechanism may be included within the stylus 60 which prevents such a conflict from occurring, e.g., that inhibits stylus position data when the bar code contact switch 71 is closed but the tip-down switch 69 is not. Such a mechanism is explained in the context of an alternative stylus discussed below, in reference to accompanying FIGS. 7 and 8.

III. Configuration of the Digitizer Section

The configuration of the preferred digitizer is explained with reference to FIGS. 4 and 5, and is also described in detail by U.S. Pat. No. 4,806,918, which is hereby incorporated by reference in its entirety as though identically set forth herein.

Figure 4:
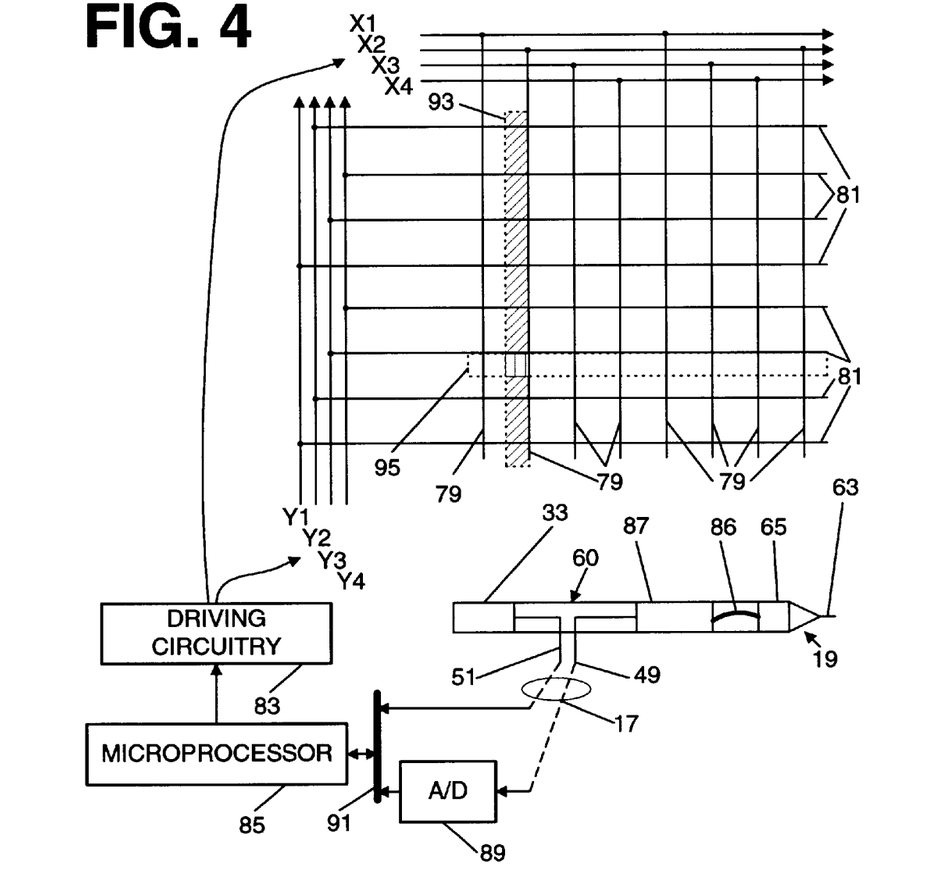
FIG. 4 is a schematic diagram illustrating the preferred layout of traces, within the digitizer section of the preferred clipboard, for detection of relative position of the stylus.

As seen in FIG. 4, the preferred digitizer 77 includes a number of vertical traces 79 and horizontal 81 which are closely spaced beneath the paper supporting surface of the digitizer section (these latter elements are best seen in FIG.

1). The vertical traces 79 and horizontal traces 81 seen in FIG. 4 cross each other to form a patter of squares, each of which corresponds to a tiny section of the paper supporting surface. Each trace 79 or 81 is, in turn, coupled to an appropriate driver signal. In FIG. 4, only four horizontal driver signals "X1", "X2", "X3", and "X4" and four vertical driver signals "Y1", "Y2", "Y3", and "Y4" are indicated, with approximately fifty squares; however, it should be understood that there are actually a much greater number of each and that the squares are seen as few in number and large in size for purposes of explanation.

Each of the driver signals is connected to driver circuitry 83, which is under the control of a microprocessor 85 (e.g., the CPU). In a repeating pattern, the driving circuitry pulses each one of the driver signals with voltage signal, each of which is passed to different ones of the horizontal and vertical traces 79 and 81 in quick succession; no two driver signals are pulsed at the same time. Referring to the pattern of traces in FIG. 4, it will be noted that the driver signals are varyingly connected to traces in a non-repeating pattern. The stylus 60, and in particular, its electrical sensor 65, detect each driver signal at a strength proportional to distance of the stylus' tip 63 from a corresponding trace 79 or 81. The detected analog signals from the sensor 65 are provided via leads 86 to an internal amplifier 87 which normalizes the detected signal strength to a scale of zero to +4.50 VDC. The internal amplifier produces the "pen data" signal 49, which is coupled through the tether 17 to an analog-to-digital ("A/D") converter 89 internal to the digitizer section.

The microprocessor 85 during normal operation repeatedly samples the A/D converter 89 through an internal bus 91 to obtain digital values representing the instantaneous detected electrical signal strength at the stylus' tip 63. Since the microprocessor 85 is in communication with the driving circuitry 83 and can match timing of the driver signals X1–4 and Y1–4 with the digital values from the A/D converter 89, the microprocessor can determine the detected strength of each driver signal X1–4 and Y1–4. Furthermore, since detected strength varies with distance between a trace 79 or 81 carrying these driver signals, and the driver signals are distributed in a varying and non-repeating manner, the microprocessor can determine stylus position to within one-quarter of each square indicated in FIG. 4.

IV. Preferred Scheme for Processing Data

Figure 5:
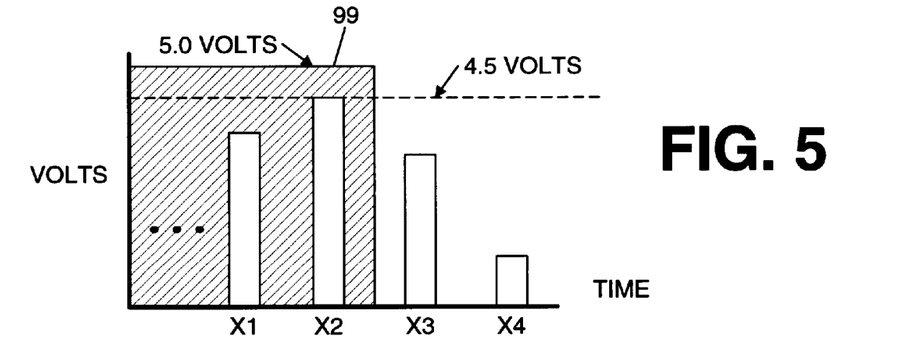
FIG. 5 is a graph of voltage versus time for data signals produced by each of the bar code scanner and the writing tip of the preferred stylus.

FIG. 5 presents a hypothetical illustration of detected strength (at the stylus' tip) of four driver signals, X1–4. The driver signal "X2" is in the illustrated hypothetical the strongest detected signal, followed by "X1" and "X3" and "X4." Referring back to FIG. 4, the arrangement of traces that yields this signal pattern indicates that the stylus tip is within the hatched region identified by reference numeral 93. Using a lookup table stored in firmware, firmware causes the microprocessor 85 to assign a horizontal position value to the stylus 60 with respect to the digitizer surface. Assuming that Y1–4 were detected to have the same relative strengths as X1–4, e.g., with "Y2" being the strongest detected driver signal, the microprocessor 85 would also determine that the stylus' tip 63 was within the region identified by the reference numeral 95. Taking these two regions 95 and 97 together would isolate a square 97, the intersection of these regions and one quarter square bounded by vertical and horizontal traces 79 and 81, as the exact position of the stylus tip 63. This example provides an example of coarse position processing, and additional processing of "X" and "Y" values results in an even more precise indication of stylus position.

As previously mentioned, it should be understood that the above description of digitizer configuration is a simplification, and in practice there will be a fairly large number of driving signals, for example "X1" through "X8" and "Y1" to "Y8", or even a larger number of such signals.

In analyzing stylus position data or data from the bar code scanning mechanism 33, the microprocessor 85 will also be operatively coupled to the "activity" signal 51. Importantly, in determining whether stylus position data corresponds to ink being applied to a page or form, the microprocessor will normally additionally sample this "activity" signal (to determine the state of the tip-down switch) to identify whether a page or form is being written upon. Preferably, only "ink" data from the writing tip 19 is written into memory for later use.

As indicated by the foregoing description, the pulses produced by the writing tip 19 are analog pulses which must be digitized upon receipt by the clipboard. By contrast, the output of the bar code scanning mechanism 33 is provided in digital format and is coupled to the bus 91 through a buffer (not seen in FIG. 4). Preferably, the system includes a mechanism for processing position data or bar code data when data is present and for determining which data input is to be interpreted. One possible approach would be to separately interrogate the A/D converter 89 and the aforementioned buffer to determine whether valid data is present in either.

In the preferred embodiment, however, the CPU is interrupted periodically (e.g., every ten milliseconds) and polls a circuit to determine whether there is incoming data which could possibly be bar code data or stylus position data. With reference to FIG. 5, a hypothetical bar code data signal 99 is indicated as having states of +5.0 VDC and zero VDC over time. The aforementioned driver signals X1–4 are illustrated also and may be contrasted with the bar code data signal using a threshold of +4.50 VDC. Using the aforementioned discrimination circuit, CPU can determine which type of data is present (for example by sensing the presence of greater than +4.50 VDC on the "BC data" signal).

Figures 6, 8:
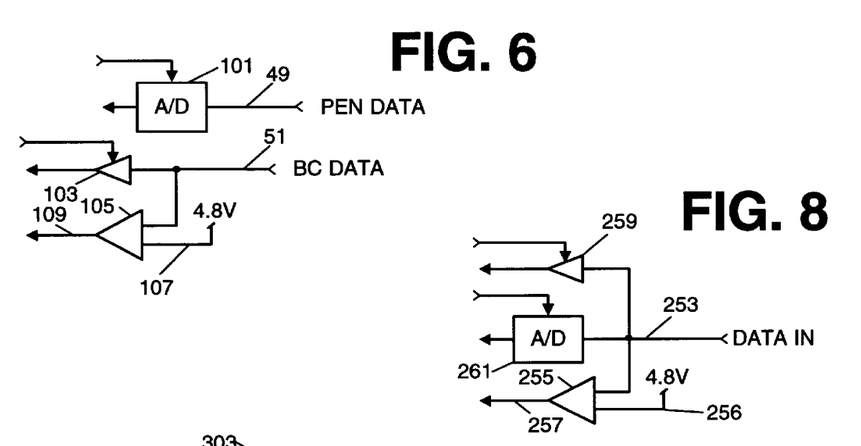
FIG. 6 is a schematic diagram illustrating circuits used to detect and distinguish each of the types of data illustrated in FIG. 5.
FIG. 8 is a schematic diagram illustrating a circuit used to detect and distinguish each of bar code data and position data from the stylus of FIG. 7, where both such data are intermingled on a single "DATA IN" line.

The preferred discrimination circuit is indicated in FIG. 6. It will be understood that the term "valid data" as used herein does not necessarily mean that a complete data signal has been received by the clipboard but rather, as indicated by FIG. 5, that the microprocessor analyzes each of the aforementioned data signals to determine whether they have data which can possibly be an incoming bar code signal or stylus "pen data." As indicated by FIG. 5, data produced by the bar code scanning mechanism will be presented to the clipboard as a clean logic signal, either at 5 volts or a ground, with a signal normally being kept at ground. As a result, when the activity signal is raised, the microprocessor can determine whether or not valid bar code data is being presented over the bar code data line by sampling that line to determine whether or not it ever falls between +4.50 volts and +5.00 volts DC. At the same time, the signal produced by the writing instrument when valid will never be greater than 4.50 volts DC and it will oscillate with much greater frequency than valid bar code data. As a result and as it will be described further below, the clipboard's microprocessor need only sample the inputs provided by each of the writing mechanism and bar code scanning mechanism to determine which of them is asserting valid data in connection with the lowering of the "activity" signal. Preferably, this comparison is assisted by a threshold detection circuit as will be described below in connection with FIG. 6.

As indicated in FIG. 6, the data signals from the stylus when received by the clipboard may be distinguished since the "pen data" signal 49 carries pulses varying in magnitude (and corresponding to the aforementioned driver signals)

and the "BC data" signal 51 carries either +5.0 or zero VDC. Each of these signals is passed through a buffer to the CPU, in the case of stylus position data, through an A/D converter 101, and through a tri-state buffer 103 in the case of bar code data. The CPU could separately poll each buffer to determine whether they carry data, but since each data signal involves continued analysis over time, e.g., sampling each few microseconds in the case of stylus position data, it is preferred to implement a separate processing routine depending upon a determination that either valid bar code data or valid stylus position data is probably present. To this effect, since the CPU will normally analyze stylus position data to process inactivity (and place the clipboard into a power conserving sleep mode), the "BC data" signal 51 is fed into a comparator 105 which has as its second input a +4.80 VDC reference signal 107. When the CPU is periodically interrupted to process data, e.g., each ten milliseconds, it looks to the aforementioned "activity" signal (not seen in FIG. 6) to determine whether the tip-down or bar code contact switches are depressed; if, on the other hand, the "activity" signal indicates contact of the stylus with a surface, the CPU will access an output 109 of the comparator and implement processing for bar code data if appropriate. The CPU then analyzes the output of the tri-state buffer until an entire valid bar code has been read or an error has been detected.

V. An Alternative Stylus and Data Scheme

Figure 7:
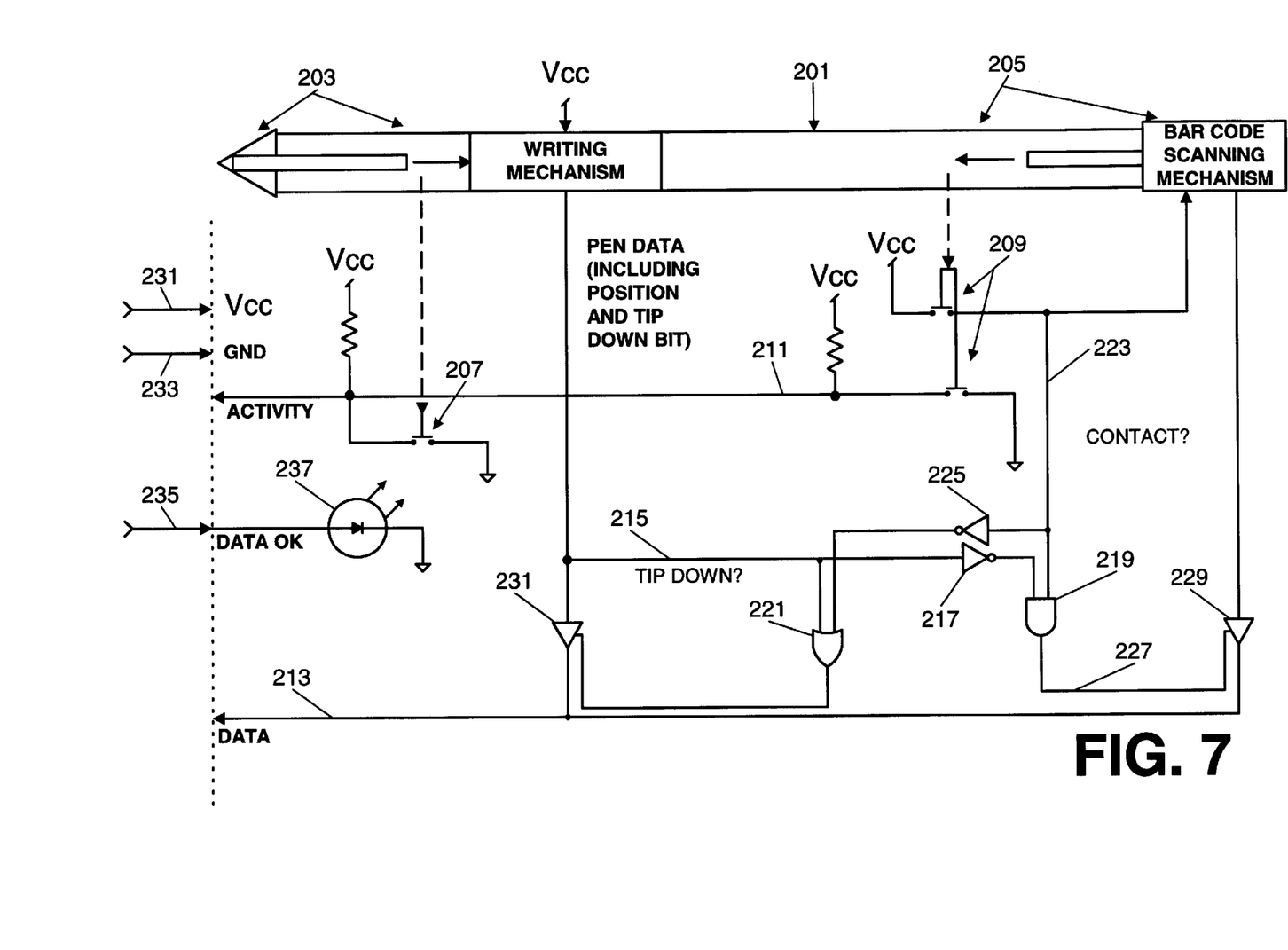
FIG. 7 is a schematic view showing electrical operation of an alternative stylus; the stylus of FIG. 7 uses one data signal which carries both position data from the writing tip and bar code data from the bar code scanner.

FIGS. 7–8 present an alternative stylus and supporting circuitry which utilize a single data line for supply of both stylus position data and bar code data.

As indicating in FIG. 7, a stylus 201 includes both a writing tip 203 at one end of the stylus and bar code scanning mechanism 205 at an opposite end of the stylus. Each of these devices has associated momentary contact switches 207 and 209, respectively, a tip-down switch and bar code mechanism switch, which are used to "wake-up" the CPU (not seen in FIG. 7) and cause it to perform data processing. Each of these switches is normally tied to Vcc and is brought "low" by contact, such that depression of either switch 207 and 209 will cause an "activity" signal 211 from the stylus to go low to indicate stylus activity to the CPU. As was the case with the preferred stylus embodiment, the bar code contact switch is again a double-throw switch and closure of that switch also applies temporary power to the bar code scanning mechanism 205 and its associated scanning engine during the time that the switch is depressed.

The alternative stylus 201 of FIG. 7, however, also includes circuitry for ensuring that a single "data" signal 213 represents only one of bar code data and stylus position data. To this effect, a first binary signal 215 indicating whether the tip-down switch 207 is depressed (and the pen is inking paper) is provided to an inverter 217, an "and" gate 219, and an "or" gate 221, which collectively perform logic processing. A second binary signal 223 from the bar code mechanism switch 209 is provided to a second inverter 225, the "and" and "or" gates 219 and 221, for comparison between the two binary signals. As a result of this comparison, an output 227 from the "and" gate 219 of the proper logical state indicates that the bar code mechanism is depressed against a surface, while the writing tip 19 is not depressed against a surface and, correspondingly, that output from the bar code scanning mechanism may be exclusively passed (via a gate 229) to the single "data" signal 213. Alternatively, an output of proper state from the "or" gate 221 to a corresponding gate 231 for stylus position data indicates that the writing tip 203 is depressed against a surface or that the bar code scanning mechanism is not depressed against a surface. As a result of this logic, the stylus 201 will produce stylus position data without the requirement that the writing tip 203 be in contact with a surface as long as the bar code scanning mechanism 205 is not depressed against a surface for presumed bar code scanning.

As with the preferred stylus (discussed earlier), the alternative stylus just described also utilizes power signals of Vcc 231, ground 233, and a LED control signal 235 used to illuminate an LED 237 to indicate that data has been properly read and interpreted by the CPU.

With reference to FIG. 8, for use with the alternative stylus just described, electronics 251 internal to the digitizer section can be used to automatically inform the CPU whether a "data in" signal 253 represents bar code data or stylus position data. A comparator 255 compares the "data in" signal to a +4.8 VDC reference signal 256 and provides an output 257 if the "data in" signal carries more than +4.8 VDC, indicating if positive that the "data in" signal possibly represents bar code data and not stylus position data; consequently, a positive state of the output 257 will cause the CPU (not seen in FIG. 8) to sample a buffer 259 for the logical state of the "data in" signal. Alternatively, if the output 257 is negative, indicating possible stylus position data, then the CPU will interrogate an A/D converter 261 to process stylus position data. The "activity" signal, mentioned above in connection with FIG. 7, may be used to cause the CPU to format data and write it to internal memory for storage.

The alternative stylus 201 described in connection with FIGS. 7 and 8 represents one possible design of a stylus which both implements a bar code scanner and generates stylus data for use with a digitizer, and many other implementation schemes will occur to those skilled in the art.

VI. Overview of Clipboard Flow and Processing

Figure 9:
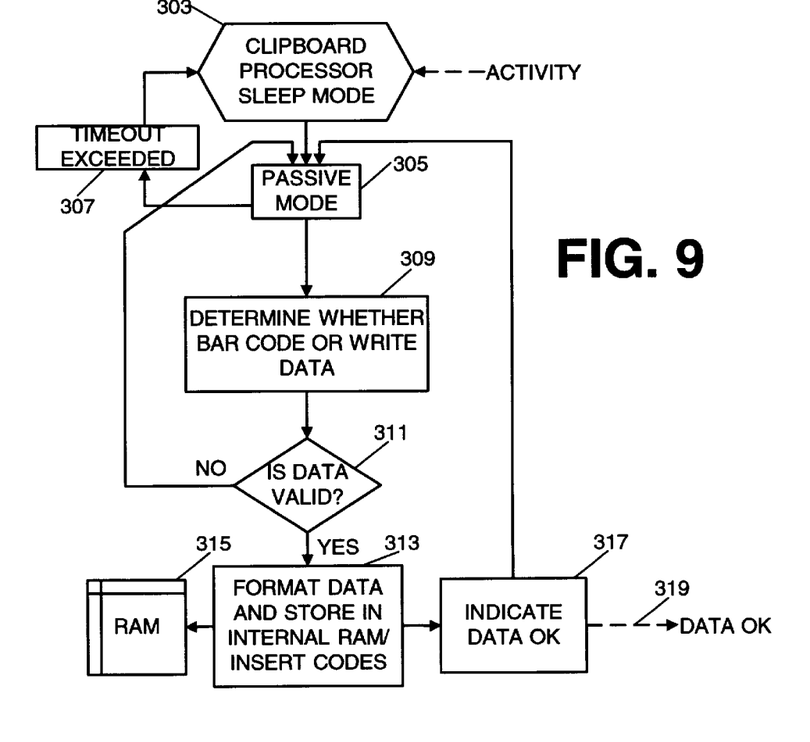
FIG. 9 is a software or firmware block diagram indicating CPU activity in sampling the circuits of FIG. 6 or FIG. 8, and responsively providing outputs indicating that data has been properly read from the stylus.

FIG. 9 provides a general overview of clipboard flow. Detection of an "activity" signal 301 is used to awaken the clipboard CPU from a sleep mode, indicated by the reference numeral 303. Each time the CPU enters this mode, it resets hardware interrupt circuitry such that a new "activity" signal will interrupt the microprocessor, and cause it to remove power savings measures. This awakening (caused by actual use of the bar code scanning mechanism or writing tip, in a manner that depressed one of their associated switches) will cause the CPU to remain awake even though those mechanisms are not being used, for a predetermined time after cessation of use or inactivity.

Once awakened, the CPU remains in a passive mode 305, in which it will analyze stylus data to determine inactivity, but not write data to memory. While in this mode, the CPU will be interrupted approximately every ten milliseconds to check for data from the stylus. Preferably, only data from the stylus which represents bar codes or ink being applied to a page or form is stored in the clipboard's internal memory. Accordingly, when interrupted, the CPU will perform processing by (a) determining whether there is pen activity, e.g., the tip-down or bar code contact switches are depressed, (b) if not, processing stylus position data to determine whether there is stylus activity, (c) if there is pen activity, processing either bar code data or stylus position data (e.g., the "BC data" or "pen data" signals referred to earlier) to ascertain whether data is valid and if so, entering such data into internal memory; finally, the CPU will reset its interrupt for subsequent data processing. The CPU will also be interrupted any time a command is entered from the user interface, and this interrupt is made to await the completion of any ongoing data processing.

As indicated by a timeout block 307, if the stylus stops moving for a predetermined amount of time (defined in firmware), the CPU will automatically reenter the sleep mode 303. If stylus position has changed or the activity signal has been lowered, the CPU will reset the timeout block 307.

If the CPU is to process activity, the CPU will sample circuits internal to the digitizer section (not seen in FIG. 9) to determine whether incoming data possibly represents either bar code data or stylus position data (this determination is represented by the reference numeral 309 in FIG. 9). If those circuits indicate that incoming data possibly represents bar code data, the CPU will implement a bar code data analysis routine, and similarly implement a stylus data analysis routine if the circuits indicate data possibly represents stylus data. These routines (represented by reference numeral 311) respectively test incoming data to determine that such data is complete (e.g., by processing data and determining that all bar code digits have been received, or that sufficient information has been received to look up and retrieve stylus position, as is then performed). If data is not valid, the CPU remains in the passive mode 305.

If valid data, however, is detected and verified, the CPU will format the data and utilize it for its processing tasks, as indicated by block 313. In the preferred embodiment, stylus position data is not inserted into memory unless it represents "ink," e.g., the tip-down switch is depressed, and the CPU during block 313 interrogates the "activity" signal (in the case of stylus position data) to determine if such is currently depressed. If "ink" or bar code data is produced, the CPU writes such data into a sequentially significant position in random access memory ("RAM") 315. Simultaneously, the CPU will write to an output buffer (for example, a multiplexer) to indicate that data is "ok" (block 317), creating a signal 319 which is coupled to the LED of the stylus (not seen in FIG. 9). Following detection of valid data and insertion into memory (or a determination that data is not valid), the CPU returns to the passive mode 305.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

We claim:

1. A handheld writing device adapted for use with a digitizer and a form positioned on the digitizer, said writing device and digitizer cooperating to permit a user to selectively create a digital electronic file of information representing writings on the form, said writing device comprising:

a body having two ends;

a writing tip mounted at one of the two ends, said writing device adapted for the user to write upon the form and digitizer, using the writing tip, said writing device providing an electronic indication of position of the writing tip with respect to the digitizer; and a scanning mechanism also mounted at one of the two ends, the scanning mechanism being selectively operated to scan bar codes and providing an electronic indication of scanned symbols;

wherein said writing device is further characterized by having at least one of configuration of the writing device where the writing tip and scanning mechanism are at opposite ends of the writing device, such that the user would tend to use only one of the writing tip and the scanning mechanism at any given time, and an interpretation mechanism that causes electronic output of said writing device to be limited to only one of the electronic indications from the writing tip and the electronic indication from the scanning mechanism at any given time.

2. A handheld writing device according to claim 1, wherein:

the writing tip and the scanning mechanism are mounted at substantially opposite ends of the body.

3. A handheld writing device according to claim 1, wherein said handheld writing device provides a data output and further comprises:

means for inhibiting one of the electronic indications, such that said handheld writing device provides as said output only electronic indications from one of the scanning mechanism and the writing tip at a given time.

4. A handheld writing device according to claim 1, further comprising:

an interpretation mechanism operatively coupled to each of the writing tip and the scanning mechanism, the interpretation mechanism interrogating electronic indications and interpreting them as originating with no more than one of the writing tip and the bar code scanning mechanism at any given time.

5. A handheld writing device according to claim 4, wherein the interpretation mechanism includes a threshold detection mechanism, the threshold detection mechanism being coupled to the electronic indication provided by one of the writing tip and the scanning mechanism and comparing the same against a predetermined threshold, the threshold detection mechanism responsively indicating whether the electronic indication represents possible data from said one of the writing tip and bar code scanning mechanism.

6. A handheld writing device according to claim 4, wherein the interpretation mechanism includes:

a tip-down switch which is coupled to the writing tip, the tip-down switch activated when the writing tip contacts the form; and means responsive to activation of the tip-down switch for accepting only electronic indications from the writing tip, notwithstanding any indication produced by the scanning mechanism.

7. A handheld writing device according to claim 4, wherein the interpretation mechanism is mounted within the body.

8. A handheld writing device according to claim 1, further comprising a hardwired tether which physically and electronically connects the body to the digitizer.

9. A handheld writing device according to claim 1, wherein the writing tip includes an inking mechanism, such that the user can both make visual marks on the form and simultaneously create an electronic record of visual marks made on the form.

10. A data entry system that permits a user to selectively create a digital electronic file of information entered onto a form, said data entry system comprising:

a digitizer board having a form-supporting surface;

a writing device including a body having two ends, a writing tip mounted at one of the two ends, the writing tip adapted for the user to write on the form, the writing tip providing an electronic indication of position of the writing instrument with respect to the digitizer board, a scanning mechanism also mounted at one of the two ends, the scanning mechanism providing an electronic indication of scanned symbols; and an interpretation mechanism operatively coupled to each of the writing tip and the bar code scanning mechanism that interrogates electronic indications and interprets them as originating with no more than one of the writing tip and the scanning mechanism at any given time, and passing only such data for inclusion in the electronic file;

wherein the digital electronic file is created from the electronic indications.

11. A data entry system according to claim 10, wherein:

the form mounts a bar code;

the scanning mechanism is adapted to scan the bar code; and the digitizer board is responsive to scanning of the bar code to insert a form identification code into a serial stream of position data produced by the writing tip.

12. A data entry system according to claim 11, wherein:

the digitizer board includes a central processing unit which receives the electronic indications and develops the digital electronic file therefrom; and the central processing unit processes the electronic indications to derive both scanned bar code data and position data for inclusion in the digital electronic file.

13. A data entry system according to claim 12, wherein the digitizer board includes:

internal memory which stores the bar code data and the position data; and a transmission device adapted to communicate the bar code data and the position data to a remote digital device.

14. A data entry system according to claim 10, wherein:

said data entry system further comprises a hardwired tether which electronically and physically connects the writing tip to the digitizer board;

the hardwired tether includes a data communication path which couples electronic indications of position produced by the writing tip and electronic indications representing bar codes produced by the scanning mechanism with the digitizer board;

the interpretation mechanism includes a comparison device located in the digitizer board that compares electronic indications with a predefined quantity, the comparison device providing an output indicating whether the electronic indications represent valid values of at least one of bar code data and position data.

15. A data entry system according to claim 10, wherein:

said data entry system further comprises a hardwired tether which electronically and physically connects the writing tip to the digitizer board;

the hardwired tether includes a single data communication path for both electronic indications of position produced by the writing tip and electronic indications representing bar codes produced by the scanning mechanism; and the interpretation mechanism includes a circuit located in the body that resolves conflict between simultaneous production of data by the writing tip and the scanning mechanism.

16. A data entry system according to claim 10, wherein the writing tip and the scanning mechanism are mounted at opposite ends of the writing device.

17. In a data entry system having a digitizer that supports a form, and a stylus that permits a user to write visual marks on the form while simultaneously retaining an electronic record of marks entered on the form, the improvement comprising:

a writing tip mounted at one end of the stylus, the writing mechanism being selectively actuated by a user to write on the form; and a bar code scanning mechanism mounted at an opposing end of the stylus, opposite the one end, the bar code scanning mechanism being selectively actuated by a user to scan a bar code.

18. An improvement according to claim 17, further comprising:

a physical switch which influences whether data read using the stylus is interpreted as stylus data or bar code data, the switch having a first position which causes data read using the stylus to be interpreted as possible stylus position data, and a second position which causes data read using the stylus to be interpreted as possible bar code data.

* * * * *